A. G. Smith,
Derrick.

Nº 66,745.   Patented July 16, 1867.

Witnesses.
W. H. Furnidge
Frank Alden

Inventor.
Albert G. Smith

United States Patent Office.

ALBERT G. SMITH, OF CLEVELAND, OHIO.

Letters Patent No. 66,745, dated July 16, 1867.

IMPROVED TRENCHING AND HOISTING APPARATUS.

*The Schedule referred to in these Letters Patent and making part of the same.*

TO ALL WHOM IT MAY CONCERN:

Be it known that I, ALBERT G. SMITH, of Cleveland, in the county of Cuyahoga, and State of Ohio, have invented certain new and useful Improvements in Hoisting Apparatus for Trenching; and I do hereby declare that the following is a full and complete description of the same, reference being had to the accompanying drawings, making a part of this specification, in which—

Figure 1:
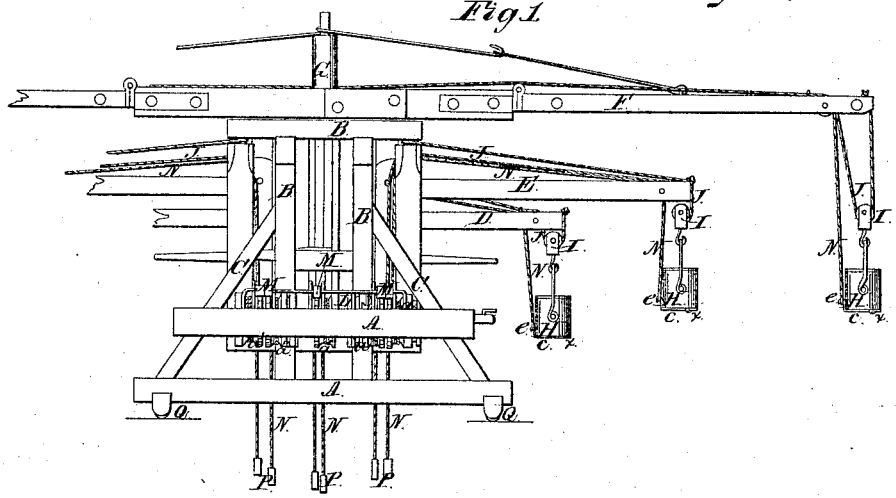
Figure 2:
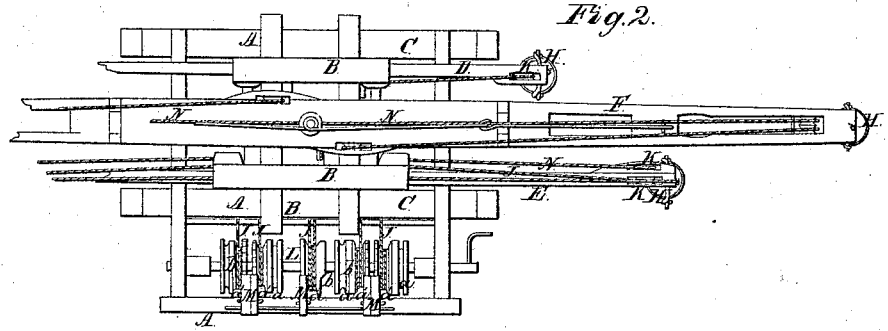
Figure 3:
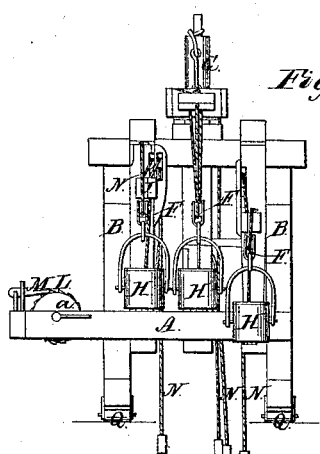

Figure 1 is a side view of the machine.
Figure 2 is a top view.
Figure 3, an end view.
Like letters refer to like parts in the different views.

This apparatus consists of the horizontal frame A and the supplementary vertical frame B, stayed by the braces C. The cranes D E are placed in and supported by the frame B, whereas the crane F is secured to the shaft G, and swings over the top of the frame. From the extremity of each crane is suspended a bucket, H, which is raised and lowered by the pulley I and ropes J, one end of the ropes being fixed to the end of the crane, passing thence through the sheave K over the arms of the crane, through which they pass down over sheaves to the windlass L, and on which they are wound up, and the buckets thereby elevated, as will hereafter be shown. It will be observed that there are two sets of pulleys on the shaft, constituting the windlass $a$ $a'$. $a'$, on which the ropes are wound, is adjustable or loose upon the shaft, whereas $a$ is fixed or rigid. A section of each side of each pulley is cut away, leaving a shoulder, $b$, fig. 2. These shoulders form a clutch, by means of which the rigid pulleys carry the free one when the two are made to engage. In the periphery of each free pulley are cut notches or teeth, into which the pawls M fall as the rope is being wound up, and thereby preventing any unexpected back action of the windlass; also to retain the buckets when elevated. The bail of the bucket is hinged at the middle in order to facilitate its tilting for discharging its contents. Across the bottom os the bucket is a stay, $c$, one end of which is hinged to the side at the point $x$, and the other terminates in a hook, $e$, up the side, and to which the rope N is attached, which reaches from thence up through the arm of the crane, passing over sheaves K along the arm, thence down through the same toward the ground, or into the trench over which the machine stands, and to the dependent ends of which are attached the weights P, for the purpose of keeping taut the ropes as the buckets are being raised by the ropes J and windlass.

Having thus indicated the several parts of the apparatus, the operation of the same is as follows:

The machine is placed over the trench or line of work, so as to bring the extended arms of the cranes in line with the ditch. The buckets are then lowered into it and filled. When filled they are raised from the trench by throwing the free pulley of the windlass into connection with the fixed one, and the ropes are thereby wound up and the buckets raised from the trench to the bank. The several cranes are then swung around, carrying the several buckets over the bank. They are then tilted over and their contents discharged by pulling the ropes N to which the strap $c$ is attached. This strap being hinged to the side of the bucket, as above said, causes it to become inverted without allowing it to turn completely over, and thus the dirt is wholly emptied along either side of the trench, as before remarked. The pulleys $a'$ are then disengaged from the rigid ones, and the buckets lowered into the trench to be again filled, and the operation of raising and emptying repeated. This apparatus being placed on rollers Q, can be easily moved along as the work progresses, differing in this respect from an ordinary derrick, as the latter cannot be moved without much labor, by detaching the guy ropes and taking it down for that purpose, whereas this machine is self-sustaining, it also being arranged with two sets of arms or cranes. Two gangs of hands can be employed at once, and thus the work of trenching greatly expedited, or a less number of buckets can be used without making any change in the condition of the machinery.

The advantages of this machine consist in the saving of labor, the expense of scaffolding, and the employment of a less number of hands. In the ordinary manner of ditching it is found necessary, when the work has been sunk to any considerable depth, to build staging, upon which the lower gang of workmen throw the dirt, the bank being too high for them to throw it out, hence it involves the expense of another set of workmen to throw the dirt from the scaffolding out upon the bank as fast as the lower workmen may throw it upon it. By the use of this apparatus this extra labor and number of hands and expense of scaffolding are saved, and the work accomplished more expeditiously and with greater facility.

What I claim as my improvement, and desire to secure by Letters Patent, is—

1. The buckets H, provided with the tilting straps c, when arranged and operated conjointly by the pulleys I, ropes J and N, cranes D E F, and windlass L, as and for the purpose set forth.

2. The pulleys a a', pawls M, as arranged and operating conjointly and in combination with the cranes D E F and buckets H, in the manner and for the purpose described.

3. The cranes D E F, in combination with the frames A B and rollers Q, for the purpose and in the manner set forth.

4. The combination of the movable frame with one or more cranes and hoisting apparatus, so arranged over the ditch or channel being excavated that the cranes and hoisting apparatus will be self-sustaining with said frame, when operating conjointly in the manner and for the purpose set forth.

ALBERT G. SMITH.

Witnesses:
    W. H. BURRIDGE,
    E. E. WAITE.